United States Patent
Fukawatase et al.

(10) Patent No.: US 10,065,594 B2
(45) Date of Patent: Sep. 4, 2018

(54) AIRBAG DEVICE AND AIRBAG FABRICATION METHOD

(71) Applicant: Toyota Jidosha Kabushiki Kaisha, Toyota-shi, Aichi-ken (JP)

(72) Inventors: Osamu Fukawatase, Miyoshi (JP); Atsushi Nakashima, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 43 days.

(21) Appl. No.: 15/351,848

(22) Filed: Nov. 15, 2016

(65) Prior Publication Data

US 2017/0136981 A1    May 18, 2017

(30) Foreign Application Priority Data

Nov. 18, 2015  (JP) ................. 2015-225863

(51) Int. Cl.
*B60R 21/233*   (2006.01)
*B60R 21/203*   (2006.01)
*B60R 21/2338*  (2011.01)
*B60R 21/235*   (2006.01)

(52) U.S. Cl.
CPC .......... *B60R 21/233* (2013.01); *B60R 21/235* (2013.01); *B60R 21/2338* (2013.01); *B60R 21/203* (2013.01); *B60R 2021/23386* (2013.01); *B60R 2021/23533* (2013.01)

(58) Field of Classification Search
CPC ... B60R 21/203; B60R 21/205; B60R 21/233; B60R 21/2338; B60R 21/235; B60R 2021/23308; B60R 2021/23386; B60R 2021/23533; B60R 2021/23571
See application file for complete search history.

(56) References Cited

U.S. PATENT DOCUMENTS

| | | | | |
|---|---|---|---|---|
| 3,747,952 A | * | 7/1973 | Graebe | B60R 21/205 137/67 |
| 5,486,019 A | * | 1/1996 | Chevroulet | B60R 21/164 180/271 |
| 6,419,262 B1 | * | 7/2002 | Fendt | B60R 21/231 280/729 |
| 6,834,886 B2 | * | 12/2004 | Hasebe | B60R 21/233 280/743.1 |

(Continued)

FOREIGN PATENT DOCUMENTS

EP    1323618 A1    7/2003
JP    H03-032956 A    2/1991
(Continued)

*Primary Examiner* — Laura Freedman
(74) *Attorney, Agent, or Firm* — Dinsmore & Shohl LLP

(57) ABSTRACT

An airbag device, comprising: a gas generation device that is operable to generate gas; and an airbag that includes: a first chamber portion that is disposed at a vehicle front side of a vehicle seat on which a vehicle occupant sits, the first chamber portion being inflated due to gas generated by the gas generation device being supplied into the first chamber portion, a second chamber portion that is inflated due to gas generated by the gas generation device being supplied into the second chamber portion and that is disposed adjacent to the first chamber portion in a vehicle width direction, and a connection portion.

11 Claims, 13 Drawing Sheets

(56) References Cited

U.S. PATENT DOCUMENTS

| | | | | |
|---|---|---|---|---|
| 7,137,647 B2* | 11/2006 | Adomeit | B60R 21/231 | 280/743.2 |
| 7,243,947 B2* | 7/2007 | Bosch | B60R 21/233 | 280/743.1 |
| 7,360,790 B2* | 4/2008 | Hasebe | B60R 21/233 | 280/743.2 |
| 7,364,188 B2* | 4/2008 | Hasebe | B60R 21/231 | 280/729 |
| 7,396,043 B2* | 7/2008 | Choi | B60R 21/233 | 280/743.1 |
| 7,455,317 B2* | 11/2008 | Bito | B60R 21/217 | 280/732 |
| 7,766,385 B2* | 8/2010 | Fukawatase | B60R 21/233 | 280/743.2 |
| 8,403,358 B2* | 3/2013 | Choi | B60R 21/214 | 280/728.2 |
| 8,579,321 B2* | 11/2013 | Lee | B60R 21/214 | 280/729 |
| 9,150,186 B1* | 10/2015 | Belwafa | B60R 21/233 | |
| 9,162,645 B2* | 10/2015 | Cho | B60R 21/205 | |
| 9,248,799 B2* | 2/2016 | Schneider | B60R 21/205 | |
| 9,272,684 B1* | 3/2016 | Keyser | B60R 21/237 | |
| 9,376,084 B2* | 6/2016 | Choi | B60R 21/233 | |
| 9,421,935 B2* | 8/2016 | Fukawatase | B60R 21/205 | |
| 9,434,344 B2* | 9/2016 | Fukawatase | B60R 21/2338 | |
| 9,446,733 B2* | 9/2016 | Pausch | B60R 21/231 | |
| 9,446,735 B1* | 9/2016 | Jayasuriya | B60R 21/232 | |
| 9,550,469 B2* | 1/2017 | Sato | B60R 21/231 | |
| 9,623,831 B1* | 4/2017 | Deng | B60R 21/239 | |
| 9,738,243 B2* | 8/2017 | Fukawatase | B60R 21/233 | |
| 9,840,223 B2* | 12/2017 | Choi | B60R 21/2338 | |
| 9,845,067 B2* | 12/2017 | Morris | B60R 21/233 | |
| 2005/0098994 A1 | 5/2005 | Matsumura | | |
| 2005/0184489 A1 | 8/2005 | Kobayashi | | |
| 2006/0028009 A1* | 2/2006 | Hasebe | B60R 21/231 | 280/743.1 |
| 2006/0103118 A1* | 5/2006 | Hasebe | B60R 21/233 | 280/729 |
| 2006/0163848 A1 | 7/2006 | Abe | | |
| 2006/0279072 A1 | 12/2006 | Hanawa et al. | | |
| 2008/0054613 A1 | 3/2008 | Narimoto et al. | | |
| 2010/0109301 A1 | 5/2010 | Hanawa et al. | | |
| 2010/0117340 A1 | 5/2010 | Hanawa et al. | | |
| 2013/0001934 A1 | 1/2013 | Nagasawa et al. | | |
| 2016/0001735 A1* | 1/2016 | Quatanens | B60R 21/233 | 244/121 |
| 2017/0217397 A1* | 8/2017 | Sumiya | B60R 21/233 | |
| 2017/0355344 A1* | 12/2017 | Choi | B60R 21/205 | |
| 2018/0015902 A1* | 1/2018 | Maenishi | B60R 21/233 | |
| 2018/0065587 A1* | 3/2018 | Maenishi | B60R 21/231 | |

FOREIGN PATENT DOCUMENTS

| | | | |
|---|---|---|---|
| JP | 2005162195 A | 6/2005 | |
| JP | 2005239128 A | 9/2005 | |
| JP | 2006205830 A | 8/2006 | |
| JP | 2006341780 A | 12/2006 | |
| JP | 2008-062710 A | 3/2008 | |
| JP | 2013014176 A | 1/2013 | |
| JP | 2015116912 A | 6/2015 | |
| WO | WO-2016021381 A1 * | 2/2016 | B60R 21/233 |

* cited by examiner

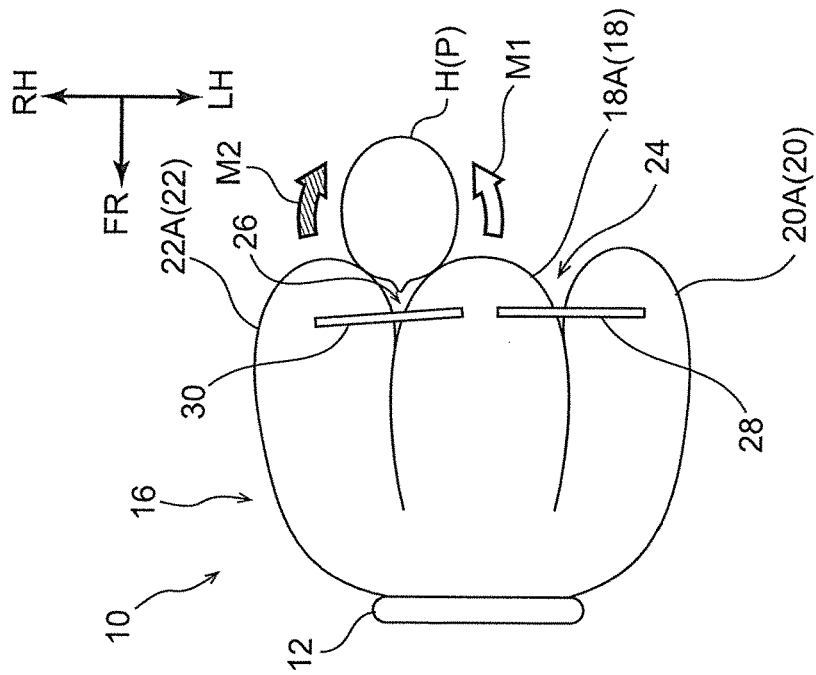
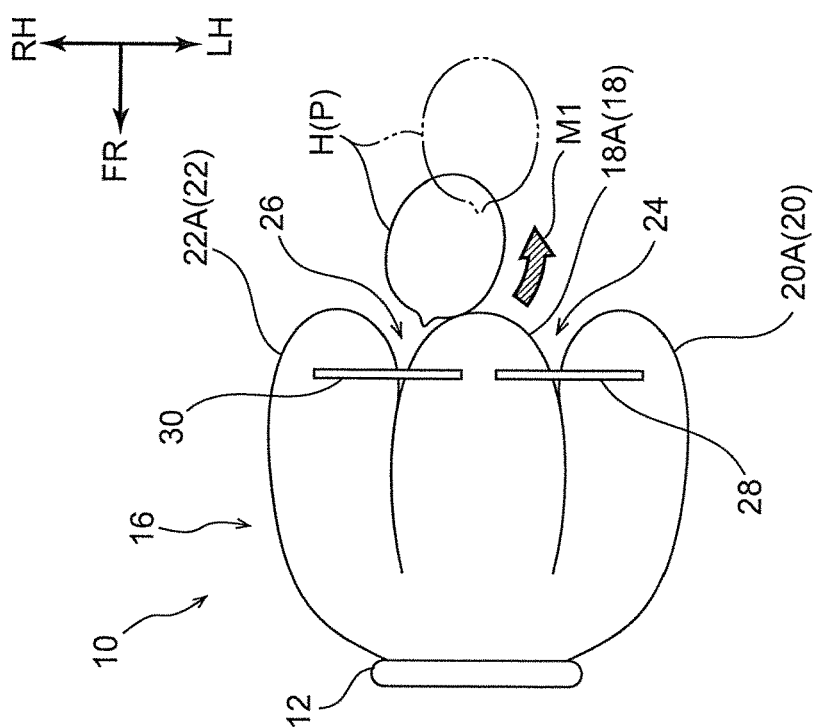

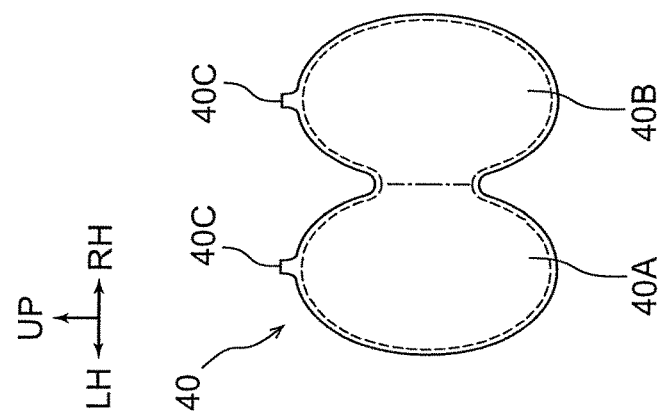
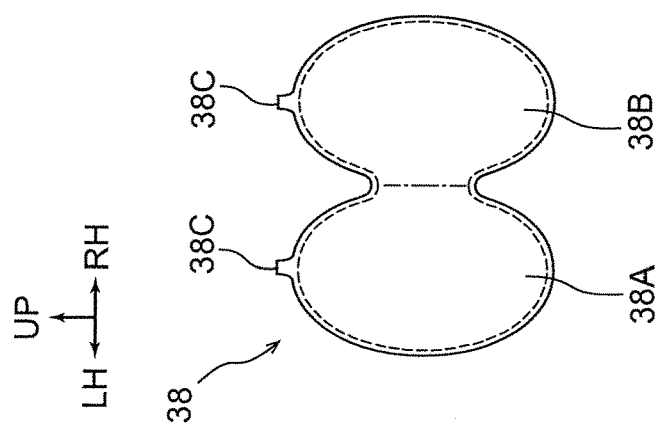
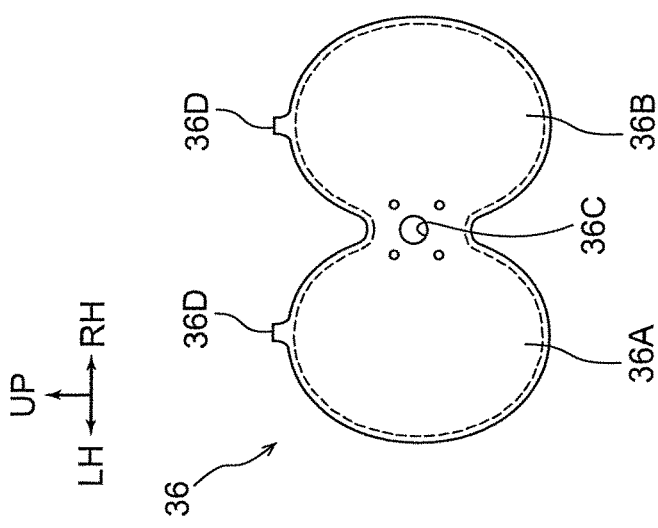

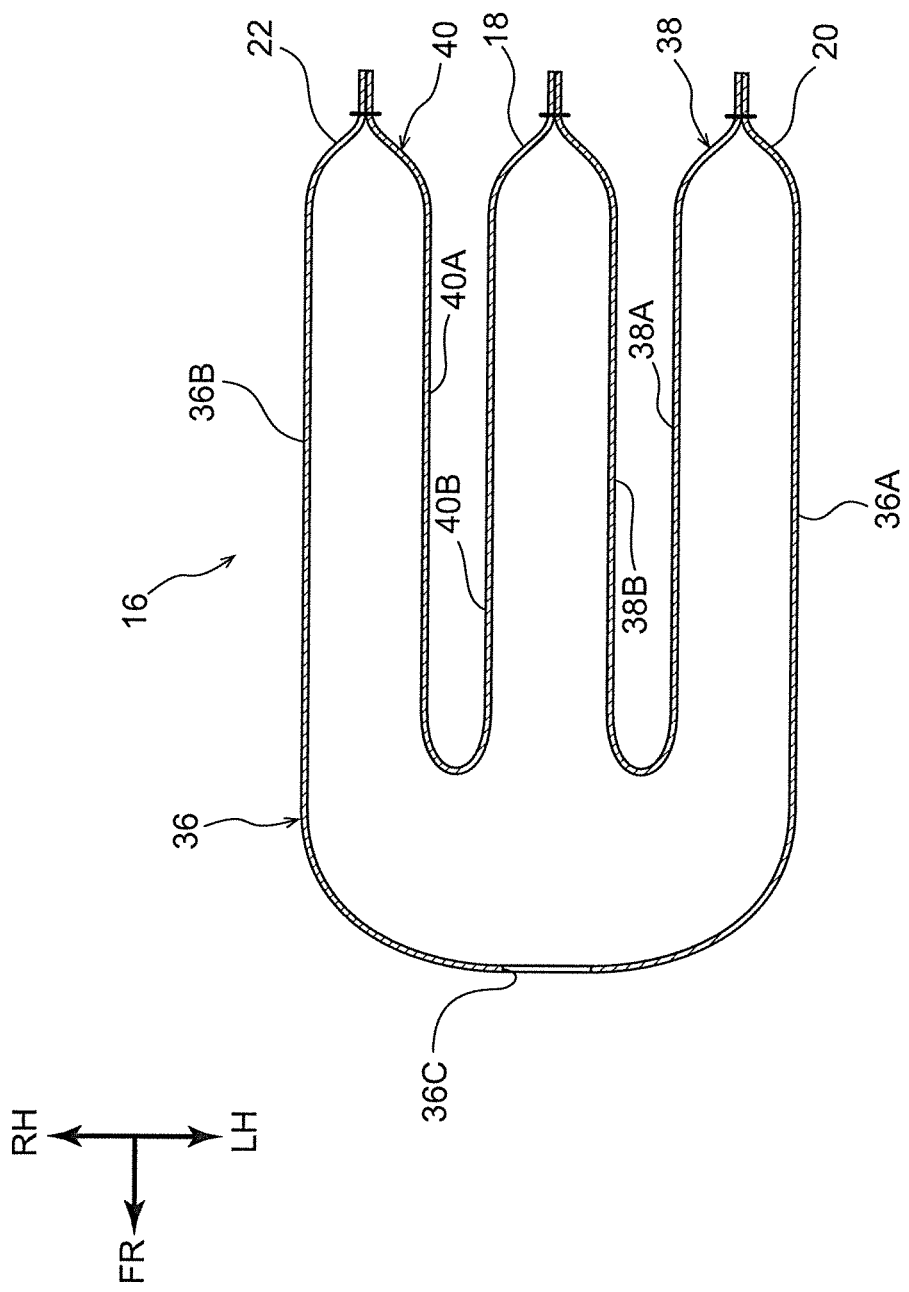

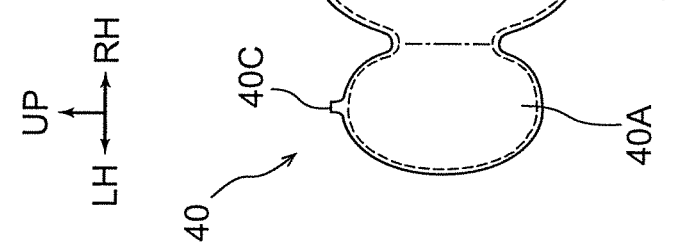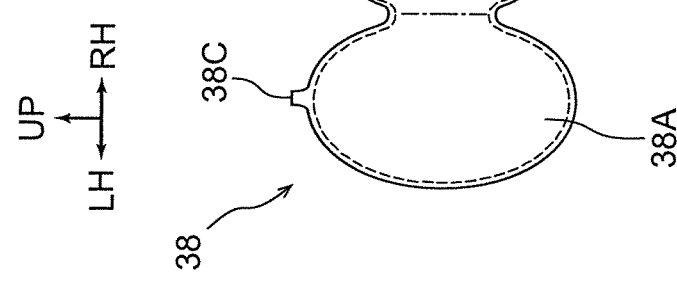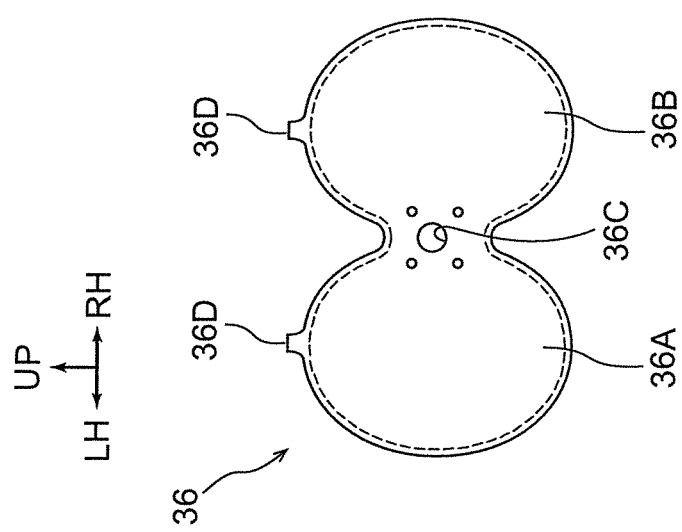

AIRBAG DEVICE AND AIRBAG FABRICATION METHOD

CROSS-REFERENCE TO RELATED APPLICATION

This application is based on and claims priority under 35 USC 119 from Japanese Patent Application No. 2015-225863 filed on Nov. 18, 2015, the disclosure of which is incorporated by reference herein.

BACKGROUND

Technical Field

The present disclosure relates to an airbag device and an airbag fabrication method.

Related Art

Japanese Patent Application Laid-Open (JP-A) No. 2013-14176 discloses an airbag device that is accommodated in a center pad of a steering wheel. This airbag device is equipped with an airbag bag body (an airbag) that, when there is a collision of the vehicle, is expanded (inflated) toward the side thereof at which a vehicle occupant is sitting on a driver seat. The airbag bag body is provided with a first chamber that protects the head portion of the vehicle occupant, and a first projection portion and a second projection portion are formed at each of two vehicle width direction edges of the first chamber. The first and second projection portions can be inflated and expanded towards the vehicle rear side relative to the first chamber. If a collision load is applied to the vehicle by a front collision, the head portion of the vehicle occupant is restrained and protected by the first chamber of the airbag bag body. If a collision load is applied to the vehicle by a side face collision, the head portion of the vehicle occupant is restrained and protected by the first projection portion and second projection portion of the airbag bag body.

Thus, with the airbag device recited in JP-A No. 2013-14176, impacts occurring at the head portion of the vehicle occupant may be moderated in different collision modes.

However, with an airbag device including an airbag that is expanded at the front side of a vehicle occupant sitting on a seat, it is desirable both to be able to restrain the head portion of a vehicle occupant when a collision load is applied to the vehicle from the vehicle front side and to be able to restrain the head portion of the vehicle occupant when a collision load is applied to the vehicle from a vehicle diagonal front side.

SUMMARY

In consideration of the circumstances described above, a first object of the present disclosure is to provide an airbag device that may restrain the head portion of a vehicle occupant when a collision load is applied to a vehicle from a vehicle diagonal front side, and a second object of the present disclosure is to provide an airbag fabrication method that enables restraint of the head portion of a vehicle occupant when a collision load is applied to a vehicle from a vehicle diagonal front side.

An airbag device of a first aspect, comprising: a gas generation device that is operable to generate gas; and an airbag that includes: a first chamber portion that is disposed at a vehicle front side of a vehicle seat on which a vehicle occupant sits, the first chamber portion being inflated due to gas generated by the gas generation device being supplied into the first chamber portion, a second chamber portion that is inflated due to gas generated by the gas generation device being supplied into the second chamber portion and that is disposed adjacent to the first chamber portion in a vehicle width direction, a boundary between the inflated first chamber portion and the second chamber portion being disposed so as to be offset in the vehicle width direction relative to a halfway line that divides the vehicle seat into equal halves in the vehicle width direction in plan view, and a connection portion that links regions at a vehicle upper side of a plurality of the inflated chamber portions together in the vehicle width direction.

According to the airbag device of the first aspect, when the gas generated by the gas generation device is supplied into the first chamber portion and second chamber portion of the airbag, the first chamber portion and second chamber portion are inflated at the front side of a vehicle occupant sitting on the vehicle seat. In a state subsequent to the inflation of the first chamber portion and the second chamber portion, the boundary between the first chamber portion and the second chamber portion is disposed so as to be offset in the vehicle width direction relative to the halfway line that divides the vehicle seat in half in the vehicle width direction. Hence, if the head portion of a vehicle occupant sitting on the vehicle seat is moved diagonally toward the front side, toward the side of a collision, by a collision load being applied to the vehicle from a vehicle diagonal front side, the head portion of the vehicle occupant is disposed between the first chamber portion and the second chamber portion, and the head portion of the vehicle occupant pushes the second chamber portion in a direction away from the first chamber portion. In this situation, in the present disclosure according to the first aspect, the regions at the vehicle upper sides of the plural chamber portions are linked together via the connection portion. Therefore, even when the head portion of the vehicle occupant that is disposed between the first chamber portion and the second chamber portion pushes the second chamber portion in the direction away from the first chamber portion, a gap between the first chamber portion and the second chamber portion is resistant to opening up. Therefore, the head portion of the vehicle occupant may be restrained.

The airbag device of a second aspect, wherein: the airbag includes a pair of the second chamber portions, the pair of the second chamber portions respectively being disposed at one side and another side of the first chamber portion in the vehicle width direction; and the connection portion links together the first chamber portion and the pair of the second chamber portions or links together one of the pair of the second chamber portions and the other of the pair of the second chamber portions.

According to the airbag device of the second aspect, if the head portion of a vehicle occupant sitting on the vehicle seat is moved diagonally toward the front-right side by a collision load being applied to the vehicle diagonally from the vehicle front-right side, the head portion of the vehicle occupant moves to between the first chamber portion and the second chamber portion at the one side. If the head portion of the vehicle occupant sitting on the vehicle seat is moved diagonally toward the front-left side by a collision load being applied to the vehicle diagonally from the vehicle front-left side, the head portion of the vehicle occupant moves to between the first chamber portion and the second chamber portion at the another side. Consequently, rotating of the head portion of the vehicle occupant may be suppressed while the head portion of the vehicle occupant is being restrained.

The airbag device of a third aspect, wherein, in an inflated state of the airbag, an end portion at a vehicle rear side of the first chamber portion is disposed at a vehicle front side relative to an end portion at a vehicle rear side of the second chamber portion.

According to the airbag device of the third aspect, if the head portion of a vehicle occupant sitting on the vehicle seat is moved diagonally toward the front side by a collision load being applied to the vehicle from a vehicle diagonal front side, the head portion of the occupant moves to between the first chamber portion and the second chamber portion while pushing the end portion at the vehicle rear side of the second chamber portion in the direction away from the first chamber portion (pushing wider the gap between the first chamber portion and the second chamber portion). Thus, in the present disclosure according to the third aspect, it may be made easier for the head portion of the vehicle occupant to move to between the first chamber portion and the second chamber portion.

An airbag fabrication method of a fourth aspect to fabricate the airbag of the airbag device according to the first aspect, the method employing a first sheet member and a second sheet member, wherein the first sheet member is formed in a sheet shape and includes a front side first extension portion and a front side second extension portion that structure regions at one side and another side in the vehicle width direction of a region at a vehicle front side of the inflated airbag, a gas generation device insertion hole at which a portion of the gas generation device is inserted being formed at a boundary between the front side first extension portion and the front side second extension portion, and wherein the second sheet member is formed in a sheet shape and includes a rear side first extension portion and a rear side second extension portion that structure regions at one side and another side in the vehicle width direction of a region at a vehicle rear side of the inflated airbag, the method comprising: forming the first chamber portion by joining an outer periphery portion of the front side first extension portion to an outer periphery portion of the rear side first extension portion; forming the second chamber portion by joining an outer periphery portion of the front side second extension portion to an outer periphery portion of the rear side second extension portion; and joining one or more of the connection portion to a plurality of the chamber portions.

According to the airbag fabrication method of the fourth aspect, the first chamber portion of the airbag is formed by the outer periphery portion of the front side first extension portion of the first sheet member and the outer periphery portion of the rear side first extension portion of the second sheet member being joined together. the second chamber portion of the airbag is formed by the outer periphery portion of the front side second extension portion of the first sheet member and the outer periphery portion of the rear side second extension portion of the second sheet member being joined together. The single or plural connection portion is/are joined to the plural chamber portions of the airbag. Through three steps described above, an airbag may be provided that may allow the head portion of a vehicle occupant moving diagonally toward the front side during a collision of a vehicle to move to between the first chamber portion and the second chamber portion and that may restrain the head portion.

An airbag fabrication method of a fifth aspect to fabricate the airbag of the airbag device according to the second aspect, the method employing a first sheet member, a second sheet member and a third sheet member, wherein the first sheet member is formed in a sheet shape and includes a front side first extension portion and a front side second extension portion that structure regions at one side and another side in the vehicle width direction of a region at a vehicle front side of the inflated airbag, a gas generation device insertion hole at which a portion of the gas generation device is inserted being formed at a boundary between the front side first extension portion and the front side second extension portion, wherein the second sheet member is formed in a sheet shape and includes a rear-left side first extension portion and a rear-left side second extension portion that structure a region at a vehicle rear side, and at one side in the vehicle width direction, of the inflated airbag, and wherein the third sheet member s formed in a sheet shape and includes a rear-right side first extension portion and a rear-right side second extension portion that structure a region at a vehicle rear side, and at another side in the vehicle width direction, of the inflated airbag, the method comprising: forming the second chamber portion at the one side of the first chamber portion by joining an outer periphery portion of the front side first extension portion to an outer periphery portion of the rear-left side first extension portion; forming the second chamber portion at the another side of the first chamber portion by joining an outer periphery portion of the front side second extension portion to an outer periphery portion of the rear-right side first extension portion; forming the first chamber portion by joining an outer periphery portion of the rear-left side second extension portion to an outer periphery portion of the rear-right side second extension portion; and joining one or more of the connection portions to a plurality of the chamber portions.

According to the airbag fabrication method of the fifth aspect, the second chamber portion at the one side of the airbag is formed by the outer periphery portion of the front side first extension portion of the first sheet member and the outer periphery portion of the rear-left side first extension portion of the second sheet member being joined together. The second chamber portion at the another side of the airbag is formed by the outer periphery portion of the front side second extension portion of the first sheet member and the outer periphery portion of the rear-right side first extension portion of the third sheet member being joined together. The first chamber portion of the airbag is formed by the outer periphery portion of the rear-left side second extension portion of the second sheet member and the outer periphery portion of the rear-right side second extension portion of the third sheet member being joined together. The single or plural connection portion is/are joined to the plural chamber portions of the airbag. Through four steps described above, an airbag may be provided that may allow the head portion of a vehicle occupant moving diagonally toward the front-right or front-left side during a collision of a vehicle to move to between the first chamber portion and one of the second chamber portions and that may restrain the head portion.

The airbag device relating to the present disclosure has an excellent effect in that the airbag device may restrain the head portion of a vehicle occupant when a collision load is applied to a vehicle from a vehicle diagonal front side. The airbag fabrication method relating to the present disclosure has an excellent effect in that the method may provide an airbag that may restrain the head portion of a vehicle occupant when a collision load is applied to a vehicle from a vehicle diagonal front side.

BRIEF DESCRIPTION OF THE DRAWINGS

Exemplary embodiments of the present disclosure will be described in detail based on the following figures, wherein:

FIG. 4A is a plan view, corresponding to FIG. 1, showing a state in which the head of the vehicle occupant starts to abut against a center chamber portion of the airbag.

FIG. 4B is a plan view, corresponding to FIG. 1, showing a state in which the head of the vehicle occupant starts to abut against a right side chamber portion of the airbag.

FIG. 7A is a plan view showing a member that structures a portion of the airbag in accordance with the first exemplary embodiment, showing a first sheet member.

FIG. 7B is a plan view showing a member that structures a portion of the airbag in accordance with the first exemplary embodiment, showing a second sheet member.

FIG. 7C is a plan view showing a member that structures a portion of the airbag in accordance with the first exemplary embodiment, showing a third sheet member.

FIG. 8 is a sectional diagram for describing joining states of the members shown in FIG. 7A to FIG. 7C.

FIG. 9A is a plan view showing a member that structures a portion of the airbag in accordance with the second exemplary embodiment, showing a first sheet member.

FIG. 9B is a plan view showing a member that structures a portion of the airbag in accordance with the second exemplary embodiment, showing a second sheet member.

FIG. 9C is a plan view showing a member that structures a portion of the airbag in accordance with the second exemplary embodiment, showing a third sheet member.

DETAILED DESCRIPTION

Airbag Device According to First Exemplary Embodiment

Figure 1:
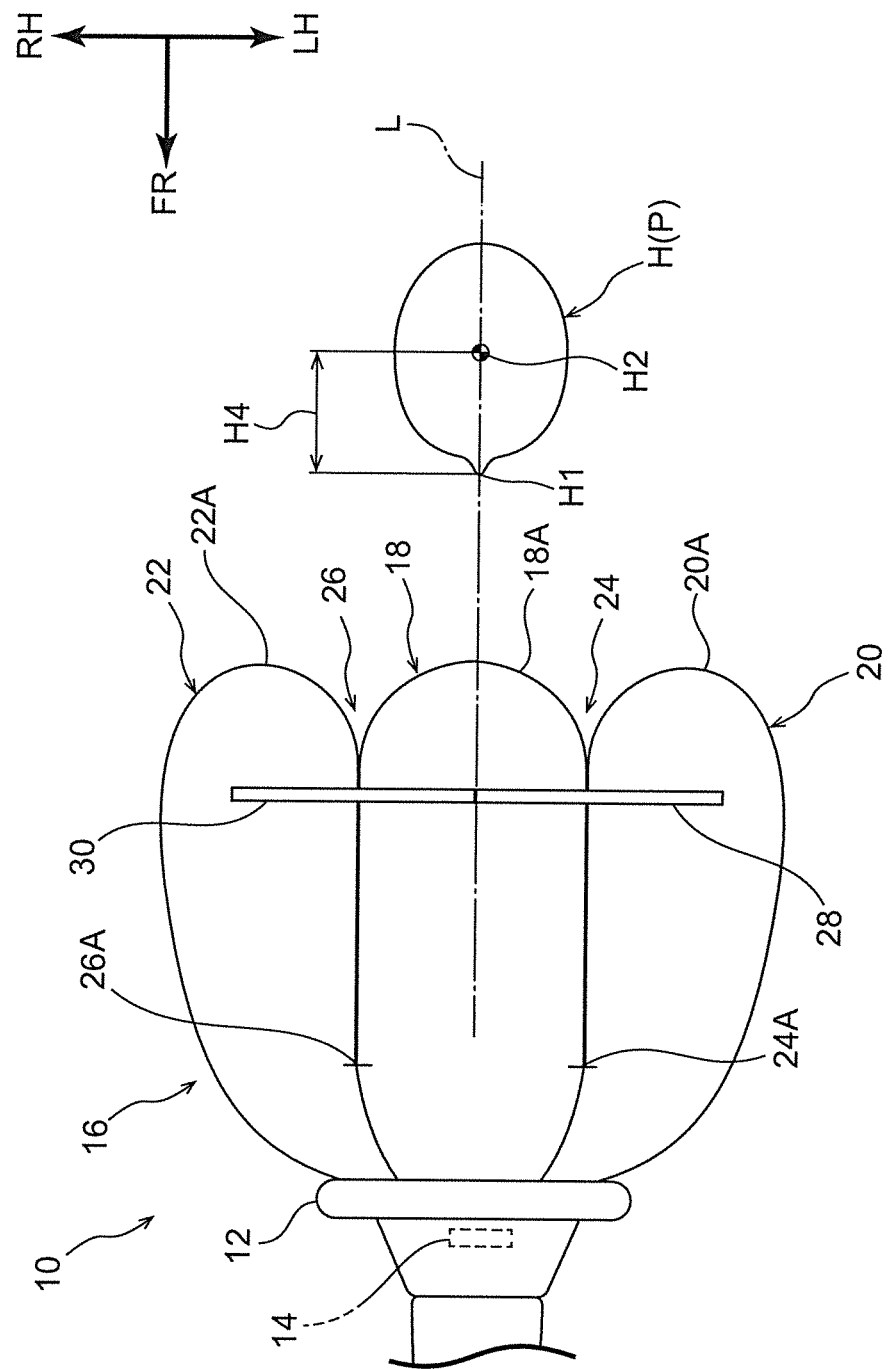
FIG. 1 is a plan view showing a state in which an airbag device in accordance with a first exemplary embodiment has been operated.

An airbag device according to a first exemplary embodiment of the present disclosure is described using FIG. 1 and FIG. 2. The arrow FR, arrow UP, arrow LH and arrow RH that are shown in the drawings indicate, respectively, a forward direction (progress direction), an upward direction, a leftward direction and a rightward direction of a vehicle. Hereinafter, where descriptions are given simply indicating the directions front and rear, left and right, and up and down, unless specifically stated otherwise, these indicate front and rear in the vehicle front-and-rear direction, left and right in the vehicle left-and-right direction (the vehicle width direction), and up and down in the vehicle up-and-down direction.

As shown in FIG. 1, an airbag device 10 according to the present exemplary embodiment is provided at a central portion of a steering wheel 12 that is disposed at the front side of a driver seat. A center pad, which is not shown in the drawings, is provided at the central portion of the steering wheel 12. The center pad is not rotationally displaced when the steering wheel 12 is operated (i.e., does not turn together with the steering wheel 12). The airbag device 10 is provided inside the center pad.

The airbag device 10 is provided with a gas generation device 14 and an airbag 16. The gas generation device 14 generates gas by operating. The airbag 16 is inflated by the gas produced by the gas generation device 14 being supplied to the interior of the airbag 16. The airbag device 10 is further provided with an airbag electronic control unit (ECU), which is not shown in the drawings, that activates the gas generation device 14 when a collision (a front collision) of the vehicle is detected.

The gas generation device 14 includes a gas generating agent and an ignition mechanism that ignites the gas generating agent. Gas at high pressure may be produced in an instant by ignition of the gas generating agent. When the high-pressure gas produced by the gas generation device 14 is supplied into the airbag 16, the airbag 16 inflates from a stowed state to an expanded state between the steering wheel 12 and a vehicle occupant P.

The airbag 16 is formed in a bag shape of which a portion at which the gas generation device 14 is connected is open. A state in which the airbag 16 is folded up into a predetermined shape and stowed in the center pad at the central portion of the steering wheel 12 is referred to as the "stowed state". A state in which the airbag 16 has been inflated to a predetermined shape is referred to as a "completed expansion state".

The airbag 16 in the completed expansion state is shown in FIG. 1, FIG. 2A, FIG. 2B and FIG. 3. As shown in these drawings, the airbag 16 is provided with a center chamber portion 18 that serves as a first chamber portion. The center chamber portion 18 is disposed facing the head H of a vehicle occupant P sitting on a vehicle seat 11 (the driver seat) in the vehicle front-and-rear direction. The center chamber portion 18 is formed to be symmetrical in the vehicle width direction about a halfway line L that divides the vehicle seat 11 into equal halves in the vehicle width direction. In the descriptions below, the "halfway line L that divides the vehicle seat 11 into equal halves in the vehicle width direction" is referred to as the "seat center line L".

The airbag 16 is further provided with a left side chamber portion 20 that serves as a second chamber portion and a right side chamber portion 22 that also serves as a second chamber portion. The left side chamber portion 20 is disposed adjacent to the center chamber portion 18 in the vehicle width direction, at the left side of the center chamber portion 18. The right side chamber portion 22 is disposed adjacent to the center chamber portion 18 in the vehicle width direction, at the right side of the center chamber portion 18. The left side chamber portion 20 and the right side chamber portion 22 are formed to be symmetrical in the vehicle width direction about the seat center line L.

In the present exemplary embodiment, a rear end portion 18A of the center chamber portion 18, a rear end portion 20A of the left side chamber portion 20, and a rear end portion 22A of the right side chamber portion 22 are formed in protruding shapes towards the vehicle rear side in a vehicle plan view, and are gently curved. In a sectional view in which the airbag 16 is cut along the vehicle width direction and the front-and-rear direction, points disposed at the vehicle rear side of the rear end portion 18A of the center chamber portion 18, the rear end portion 20A of the left side chamber portion 20 and the rear end portion 22A of the right side chamber portion 22 are referred to as protrusion direction apexes 18B, 20B and 22B. The protrusion direction apex 18B of the center chamber portion 18, the protrusion direction apex 20B of the left side chamber portion 20 and the protrusion direction apex 22B of the right side chamber portion 22 are disposed at the same position in the front-and-rear direction.

A left side slit 24 that opens to the rear side is formed at a boundary between the center chamber portion 18 and the left side chamber portion 20, and a right side slit 26 that opens to the rear side is formed at a boundary between the center chamber portion 18 and the right side chamber portion 22. The left side slit 24 and the right side slit 26 are disposed so as to be offset to the left side and the right side, respectively, relative to the seat center line L. In the present exemplary embodiment, a dimension D1 from the protrusion direction apex 20B of the left side chamber portion 20 to a terminal end 24A (front end) of the left side slit 24 is set to a dimension that is larger than a distance H4 from a front face H1 of the head H of the vehicle occupant P to a center of gravity H2 of the head H. A dimension D2 from the protrusion direction apex 22B of the right side chamber portion 22 to a terminal end 26A (front end) of the right side slit 26 is also set to a dimension that is larger than the distance H4 from the front face H1 of the head H of the vehicle occupant P to the center of gravity H2 of the head H. A distance that is used as the distance H4 from the front face H1 to the center of gravity H2 of the head H of the vehicle occupant P is the distance from the front face (the apex of the nose) to the center of gravity of the head of an AM50 dummy used for crash testing (a dummy representing the average build of an American adult male).

Figure 2A:
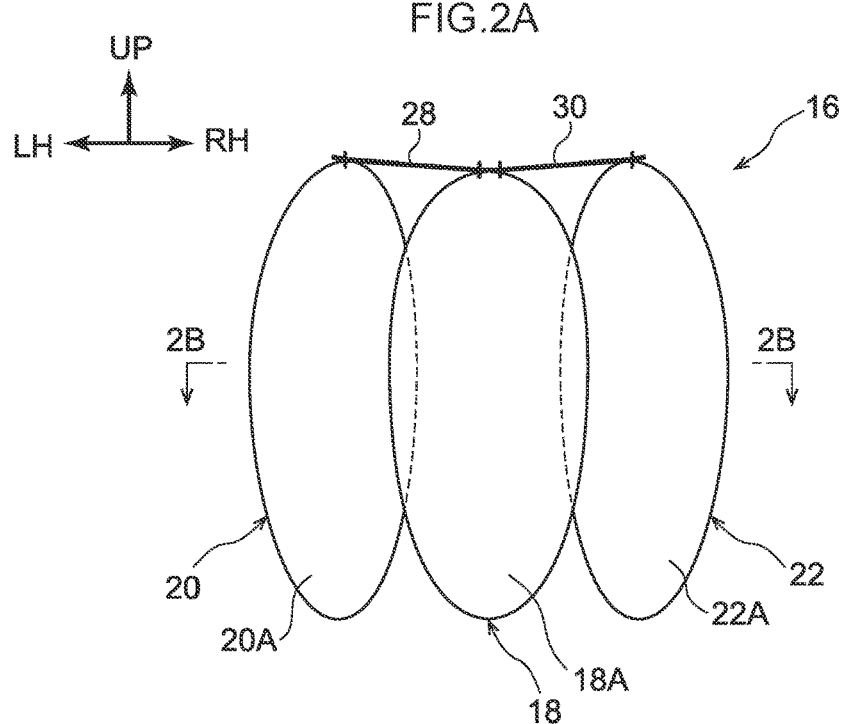
FIG. 2A is a front view in which the airbag device in accordance with the first exemplary embodiment is seen from a driver seat side thereof.
Figure 2B:
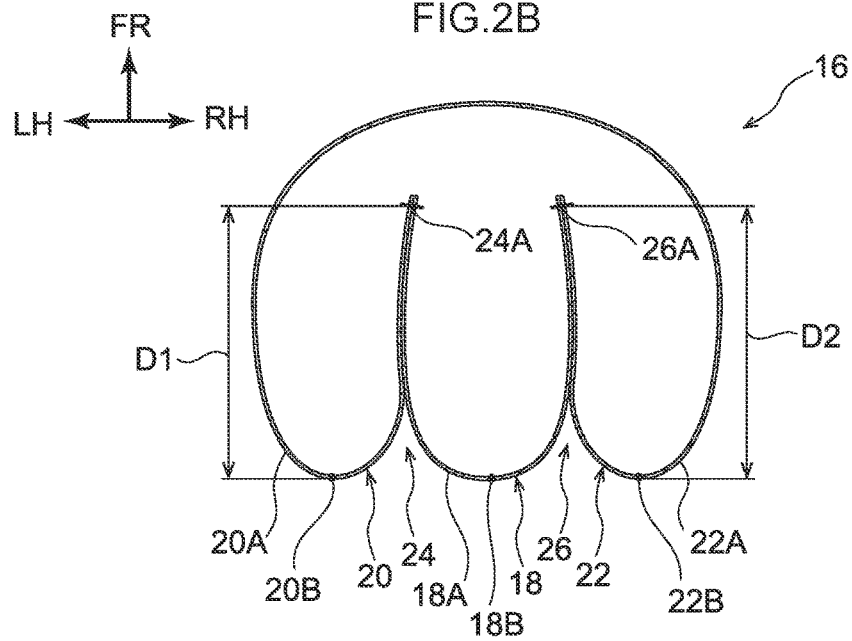
FIG. 2B is a sectional diagram showing a section of an airbag cut along line 2B-2B shown in FIG. 2A.
Figure 3:
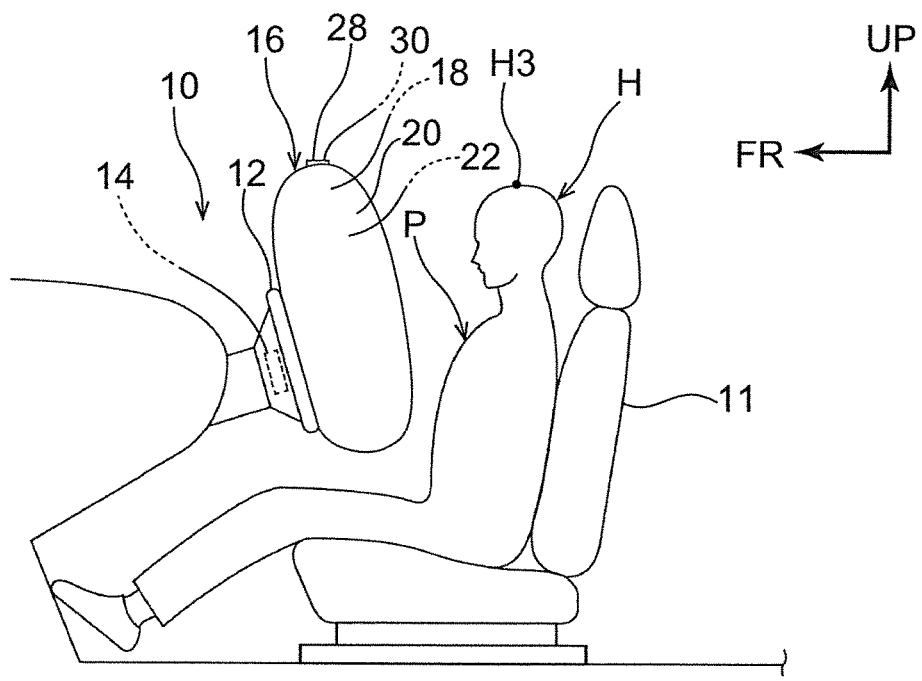
FIG. 3 is a side view showing a vehicle occupant and the airbag in a completed expansion state.

As shown in FIG. 1 and FIG. 2A, an upper end portion of the center chamber portion 18 and an upper end portion of the left side chamber portion 20 are linked together via a left side tether 28 formed in a strap shape that serves as a connection portion, and the upper end portion of the center chamber portion 18 and an upper end portion of the right side chamber portion 22 are linked together via a right side tether 30 formed in a strap shape that also serves as a connection portion. As shown in FIG. 1, the left side tether 28 and the right side tether 30 are disposed at the front side relative to the protrusion direction apex 18B of the center chamber portion 18, the protrusion direction apex 20B of the left side chamber portion 20 and the protrusion direction apex 22B of the right side chamber portion 22, but at the rear side relative to the terminal ends 24A and 26A of the left side slit 24 and right side slit 26. As shown in FIG. 3, the left side tether 28 and the right side tether 30 are disposed at the upper side relative to a head top portion H3 of the vehicle occupant P sitting on the vehicle seat 11. A position that is used as the position of the head top portion H3 of the vehicle occupant P is the position of a head top portion of the head of the AM50 dummy for crash testing, seated on the vehicle seat 11.

Operation and Effects of the Present Exemplary Embodiment

Now, operation and effects of the present exemplary embodiment are described.

As shown in FIG. 1 and FIG. 3, when a vehicle occupant P sitting on the vehicle seat 11 is driving a vehicle equipped with the airbag device 10 according to the present exemplary embodiment, if the vehicle experiences a front collision at a predetermined speed or above, the gas generation device 14 is operated and the airbag 16 is inflated in an instant. That is, the center chamber portion 18, left side chamber portion 20 and right side chamber portion 22 of the airbag 16 are inflated in an instant toward the side thereof at which the vehicle occupant P is disposed. Hence, the head H of the vehicle occupant P that is moving toward the front side due to inertia may be arrested by the center chamber portion 18, left side chamber portion 20 and right side chamber portion 22 of the airbag 16, and kinetic energy of the vehicle occupant P may be absorbed by the airbag 16. Then, the gas inside the airbag 16 is gradually released through a vent hole, which is not shown in the drawings.

When a collision load is applied to the vehicle equipped with the airbag device 10 according to the present exemplary embodiment diagonally from the front-right side, the head H of the vehicle occupant P moves diagonally toward the front-right side, as shown in FIG. 4A. When a left side region of the head H of the vehicle occupant P abuts against a right side region of the center chamber portion 18, a moment M1 in the anticlockwise direction in the vehicle plan view is produced in the head H of the vehicle occupant P. When the head H of the vehicle occupant P moves further diagonally toward the front-right side and, as shown in FIG. 4B, a right side region of the head H of the vehicle occupant P abuts against a left side region of the right side chamber portion 22, a moment M2 in the clockwise direction in the vehicle plan view is produced in the head H of the vehicle occupant P. Thus, moments produced in the head H of the vehicle occupant P may counteract one another, and an injury index of the head H of the vehicle occupant P may be effectively reduced.

Figure 5:
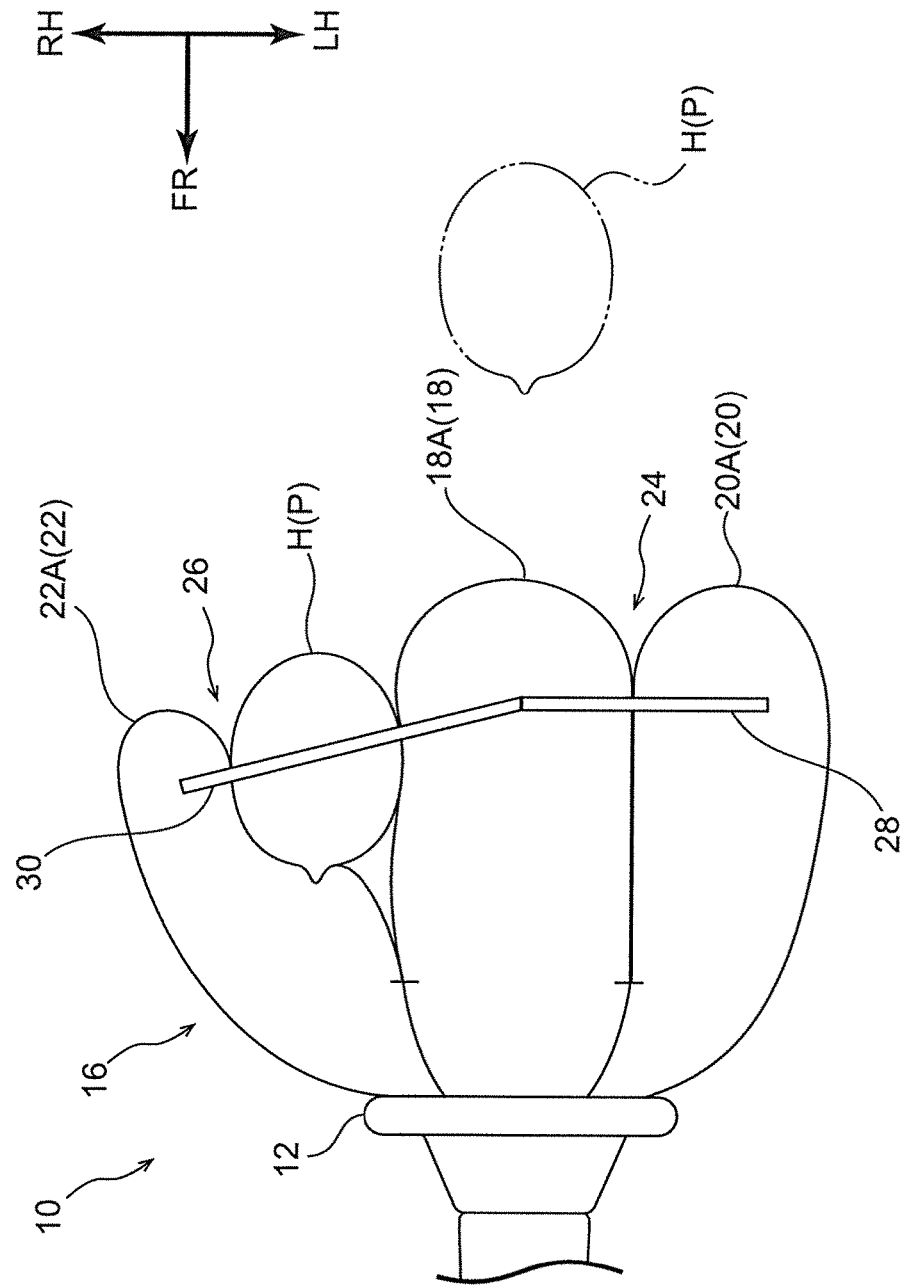
FIG. 5 is a plan view, corresponding to FIG. 1, showing a state in which the head of the vehicle occupant has moved to between the center chamber portion and the right side chamber portion of the airbag.

Then, when the head H of the vehicle occupant P moves further diagonally toward the front-right side, as shown in FIG. 5, the head H of the vehicle occupant P moves into the right side slit 26 between the center chamber portion 18 and the right side chamber portion 22. In the state in which the head H of the vehicle occupant P has moved into the right side slit 26, if the head H of the vehicle occupant P moves further diagonally toward the front-right side, the head H of the vehicle occupant P pushes the right side chamber portion 22 in the direction away from the center chamber portion 18 (i.e., to the right side). In the present exemplary embodiment, the upper end portion of the center chamber portion 18 and the upper end portion of the right side chamber portion 22 are linked together via the right side tether 30. Therefore, even when the head H of the vehicle occupant P that has moved to between the center chamber portion 18 and the right side chamber portion 22 pushes the right side chamber portion 22 in the direction away from the center chamber portion 18, the right side slit 26 between the center chamber portion 18 and the right side chamber portion 22 is resistant to opening up. Consequently, rotating of the head H of the vehicle occupant P may be suppressed while the head H of the vehicle occupant P is being restrained.

If the head H of the vehicle occupant P moves diagonally toward the front-left side due to a collision load being applied diagonally from the front-left side to the vehicle equipped with the airbag device 10 according to the present exemplary embodiment, the head H of the vehicle occupant P moves into the left side slit 24 between the center chamber portion 18 and the left side chamber portion 20 in the same manner. Thus, rotating of the head H of the vehicle occupant P may be suppressed while the head H of the vehicle occupant P is being restrained.

As shown in FIG. 3, in the present exemplary embodiment, the left side tether 28 and the right side tether 30 are disposed at the upper side relative to the head top portion H3 of the vehicle occupant P sitting on the vehicle seat 11. Therefore, contact (entanglement) between the head H of the vehicle occupant P and the left side tether 28 and right side tether 30 may be prevented or suppressed.

As shown in FIG. 1, in the present exemplary embodiment, the left side tether 28 and the right side tether 30 are each disposed at the rear side relative to the terminal ends 24A and 26A of the left side slit 24 and right side slit 26. Therefore, when the head H of a vehicle occupant P is moving inside the left side slit 24 or the right side slit 26, opening up of the left side slit 24 or the right side slit 26 may be effectively suppressed.

In the present exemplary embodiment, the dimension D1 from the protrusion direction apex 20B of the left side chamber portion 20 to the terminal end 24A (front end) of the left side slit 24 and the dimension D2 from the protrusion direction apex 22B of the right side chamber portion 22 to the terminal end 26A (front end) of the right side slit 26 are set to a dimension larger than the distance H4 from the front face H1 of the head H of the vehicle occupant P to the center of gravity H2 of the head H. Therefore, the head H of a vehicle occupant P that has moved into the left side slit 24 or the right side slit 26 may be inhibited from disengaging from the left side slit 24 or right side slit 26.

Airbag Device According to Second Exemplary Embodiment

An airbag device according to a second exemplary embodiment of the present disclosure is described using FIG. 6. Members and portions corresponding with the airbag device 10 according to the first exemplary embodiment described above are assigned the same reference symbols as in the first exemplary embodiment described above and are not described here.

Figure 6A:
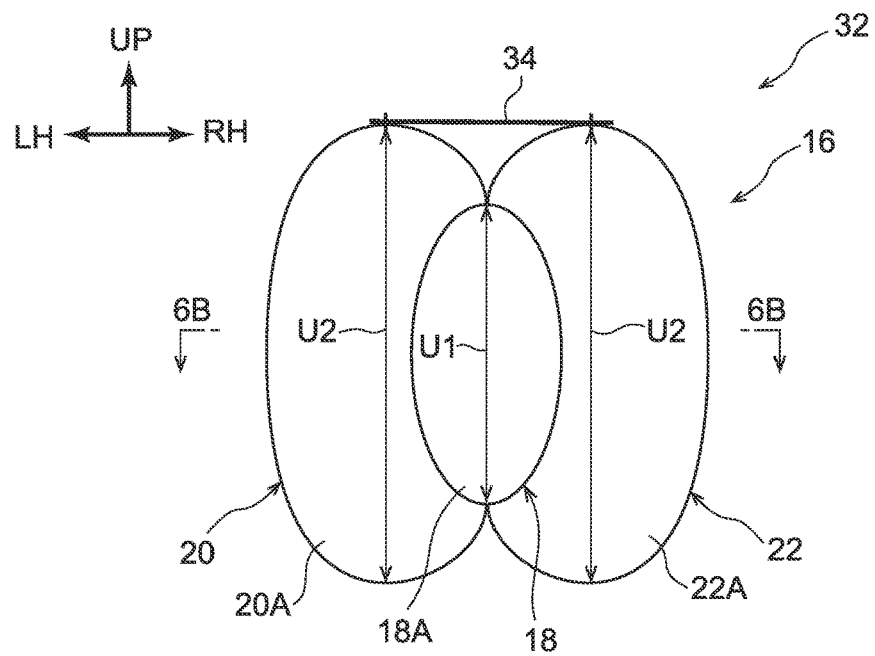
FIG. 6A is a front view in which an airbag device in accordance with a second exemplary embodiment is seen from the driver seat side thereof.
Figure 6B:
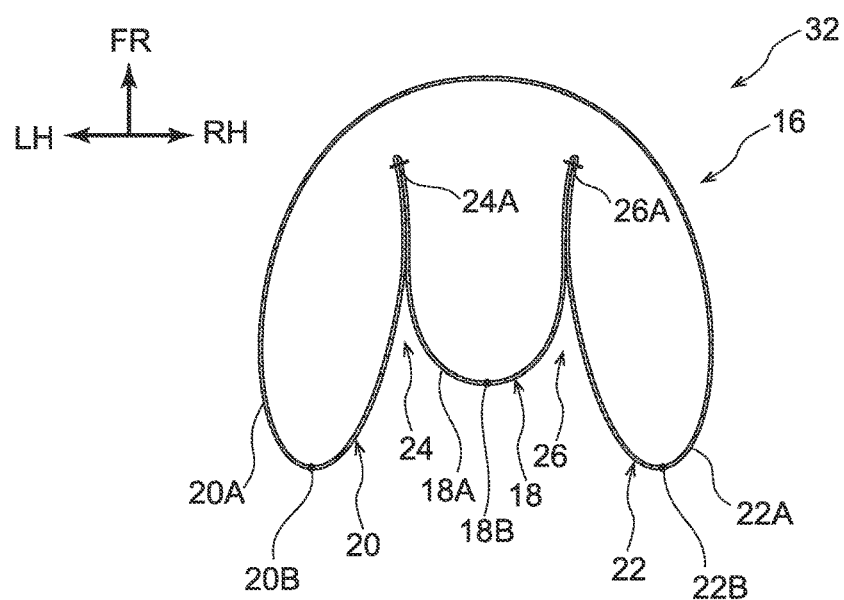
FIG. 6B is a sectional diagram showing a section of an airbag cut along line 6B-6B shown in FIG. 6A.
Figure 10:
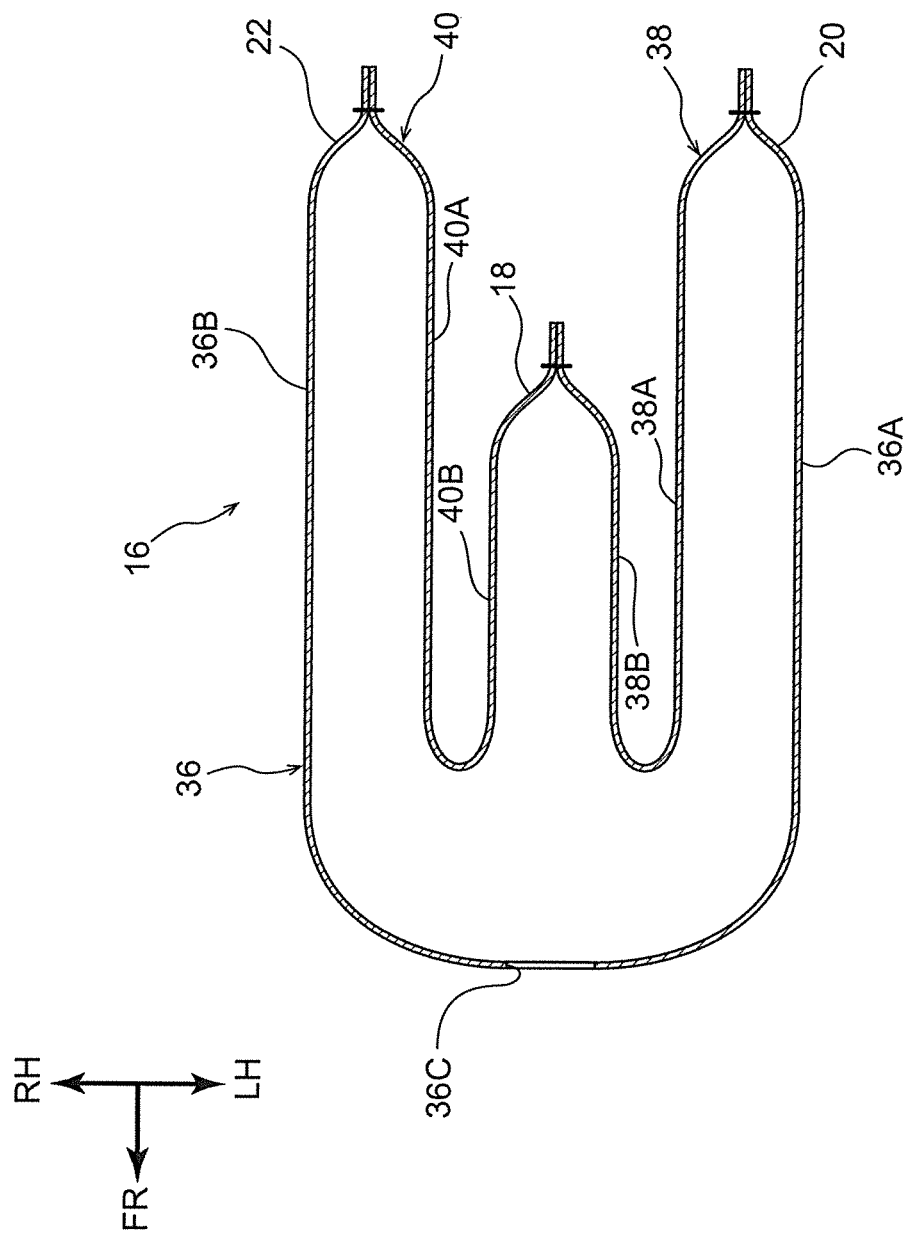
FIG. 10 is a sectional diagram for describing joining states of the members shown in FIG. 9A to FIG. 9C.

As shown in FIG. 6A and FIG. 6B, in an airbag device 32 according to the present exemplary embodiment, a face at the vehicle rear side of the center chamber portion 18 in the completed expansion state is disposed at the vehicle front side relative to faces at the vehicle rear side of the left side chamber portion 20 and the right side chamber portion 22 in the completed expansion state, and an upper end portion of the left side chamber portion 20 and an upper end portion of the right side chamber portion 22 are linked together in the vehicle width direction via a tether 34 that serves as the connection portion.

To describe this in more detail, the protrusion direction apex 18B of the center chamber portion 18 is disposed at the front side relative to the protrusion direction apex 20B of the left side chamber portion 20 and the protrusion direction apex 22B of the right side chamber portion 22. Therefore, the rear end portion 18A of the center chamber portion 18 is disposed at the front side relative to the rear end portion 20A of the left side chamber portion 20 and the protrusion direction apex 22B of the right side chamber portion 22. A dimension U1 in the up-and-down direction of the rear end portion 18A of the center chamber portion 18 as seen by a vehicle occupant P sitting on the vehicle seat is set to be smaller than dimensions U2 in the up-and-down direction of the rear end portion 20A of the left side chamber portion 20 and the rear end portion 22A of the right side chamber portion 22.

In the present exemplary embodiment described above, if the head H of a vehicle occupant P sitting on the vehicle seat moves diagonally toward the front-left or front-right side due to a collision load being applied to the vehicle from a vehicle diagonal front side, the head H of the vehicle occupant P pushes the rear end portion 20A of the left side chamber portion 20 or the rear end portion 22A of the right side chamber portion 22 to the side thereof away from the center chamber portion 18. Hence, the head H of the vehicle occupant P moves into the left side slit 24 or the right side slit 26 while pushing wider the left side slit 24 or the right side slit 26. That is, in the present exemplary embodiment, the head H of the vehicle occupant P may more easily move into the left side slit 24 or the right side slit 26.

Airbag Fabrication Method

Now, a fabrication method of the airbag 16 described above is described.

As shown in FIG. 7A to FIG. 7C, the airbag 16 that structures a portion of the airbag device 10 according to the first exemplary embodiment described above is fabricated through the following steps, employing a first sheet member 36, a second sheet member 38 and a third sheet member 40 that are all sheet-shaped and are all formed in predetermined shapes. Below, structures of the first sheet member 36, the second sheet member 38 and the third sheet member 40 are described, and then the fabrication steps of the airbag 16 are described.

As shown in FIG. 7A, the first sheet member 36 is provided with a front side first extension portion 36A and a front side second extension portion 36B, which are to structure a region over the left side from the vehicle front side of the airbag 16 and a region over the right side from the vehicle front side in the completed expansion state. The front side first extension portion 36A and front side second extension portion 36B are respectively formed in elliptical shapes whose long axis directions are in the vehicle up-and-down direction and are formed to be symmetrical in the left-and-right direction. An up-and-down direction middle portion at the right side of the front side first extension portion 36A and an up-and-down direction middle portion at the left side of the front side second extension portion 36B are connected together. A gas generation device insertion hole 36C is formed at a connection line between the front side first extension portion 36A and the front side second extension portion 36B. A gas jetting-out portion of the gas generation device 14 (see FIG. 1), which is a portion at which the gas is jetted out, is to be inserted into the gas generation device insertion hole 36C. Respective tether joining portions 36D are formed at upper end portions of the front side first extension portion 36A and the front side second extension portion 36B. Each tether joining portion 36D is formed in a protruding shape toward the upper side.

As shown in FIG. 7B, the second sheet member 38 is provided with a rear-left side first extension portion 38A and a rear-left side second extension portion 38B, which are to structure a region at the vehicle rear side and left side of the airbag 16 in the completed expansion state. The rear-left side first extension portion 38A and rear-left side second extension portion 38B are respectively formed in elliptical shapes whose long axis directions are in the vehicle up-and-down direction and are formed to be symmetrical in the left-and-right direction. An up-and-down direction middle portion at the right side of the rear-left side first extension portion 38A and an up-and-down direction middle portion at the left side of the rear-left side second extension portion 38B are connected together. Respective tether joining portions 38C are formed at upper end portions of the rear-left side first extension portion 38A and the rear-left side second extension portion 38B. Each tether joining portion 38C is formed in a protruding shape toward the upper side.

As shown in FIG. 7C, the third sheet member 40 is provided with a rear-right side first extension portion 40A and a rear-right side second extension portion 40B, which are to structure a region at the vehicle rear side and right side of the airbag 16 in the completed expansion state. Respective tether joining portions 40C are formed at upper end portions of the rear-right side first extension portion 40A and the rear-right side second extension portion 40B. Each tether joining portion 40C is formed in a protruding shape toward the upper side. Herein, the shape of the third sheet member 40 is the same as the shape of the second sheet member 38 (an identical member).

As shown in FIG. 8, first, the left side chamber portion 20 is formed by an outer periphery portion of the front side first extension portion 36A of the first sheet member 36 being joined to an outer periphery portion of the rear-left side first extension portion 38A of the second sheet member 38 (a first step). Then, the right side chamber portion 22 is formed by an outer periphery portion of the front side second extension portion 36B of the first sheet member 36 being joined to an outer periphery portion of the rear-right side first extension portion 40A of the third sheet member 40 (a second step). Then, the center chamber portion 18 is formed by an outer periphery portion of the rear-left side second extension portion 38B of the second sheet member 38 being joined to an outer periphery portion of the rear-right side second extension portion 40B of the third sheet member 40 (a third step). The order of the first to third steps described above may be modified. The joining between the respective members may be implemented by sewing, adhesion or the like.

Then, as shown in FIG. 1 and FIG. 7, one end portion of the left side tether 28 is connected to the tether joining portion 36D of the front side first extension portion 36A of the first sheet member 36 and the tether joining portion 38C of the rear-left side first extension portion 38A of the second sheet member 38, and another end portion of the left side tether 28 is joined to the tether joining portion 38C of the rear-left side second extension portion 38B of the second sheet member 38 and the tether joining portion 40C of the rear-right side second extension portion 40B of the third sheet member 40. Meanwhile, one end portion of the right side tether 30 is connected to the tether joining portion 36D of the front side second extension portion 36B of the first sheet member 36 and the tether joining portion 40C of the rear-right side first extension portion 40A of the third sheet member 40, and another end portion of the right side tether 30 is joined to the tether joining portion 38C of the rear-left side second extension portion 38B of the second sheet member 38 and the tether joining portion 40C of the rear-right side second extension portion 40B of the third sheet member 40 (a fourth step). Thus, the upper end portion of the center chamber portion 18 and the upper end portion of the left side chamber portion 20 are linked together via the left side tether 28, and the upper end portion of the center chamber portion 18 and the upper end portion of the right side chamber portion 22 are linked together via the right side tether 30.

Thus, the airbag 16 that structures a portion of the airbag device 10 according to the first exemplary embodiment is fabricated through the first to fourth steps described above.

As shown in FIG. 9A to FIG. 9C and FIG. 10, the airbag 16 that structures a portion of the airbag device 32 according to the second exemplary embodiment described above is similarly fabricated employing the first sheet member 36, second sheet member 38 and third sheet member 40 that are sheet-shaped and formed in predetermined shapes. In order to obtain the completed expansion state of the airbag 16 according to the second exemplary embodiment, up-and-down and left-and-right dimensions of the rear-left side first extension portion 38A of the second sheet member 38 are set to be larger than up-and-down and left-and-right dimensions of the rear-left side second extension portion 38B, and up-and-down and left-and-right dimensions of the rear-right side first extension portion 40A of the third sheet member 40 are set to be larger than up-and-down and left-and-right dimensions of the rear-right side second extension portion 40B. The airbag 16 according to the second exemplary embodiment is fabricated through steps corresponding to the first to fourth steps according to the first exemplary embodiment that are described above.

Figure 11:
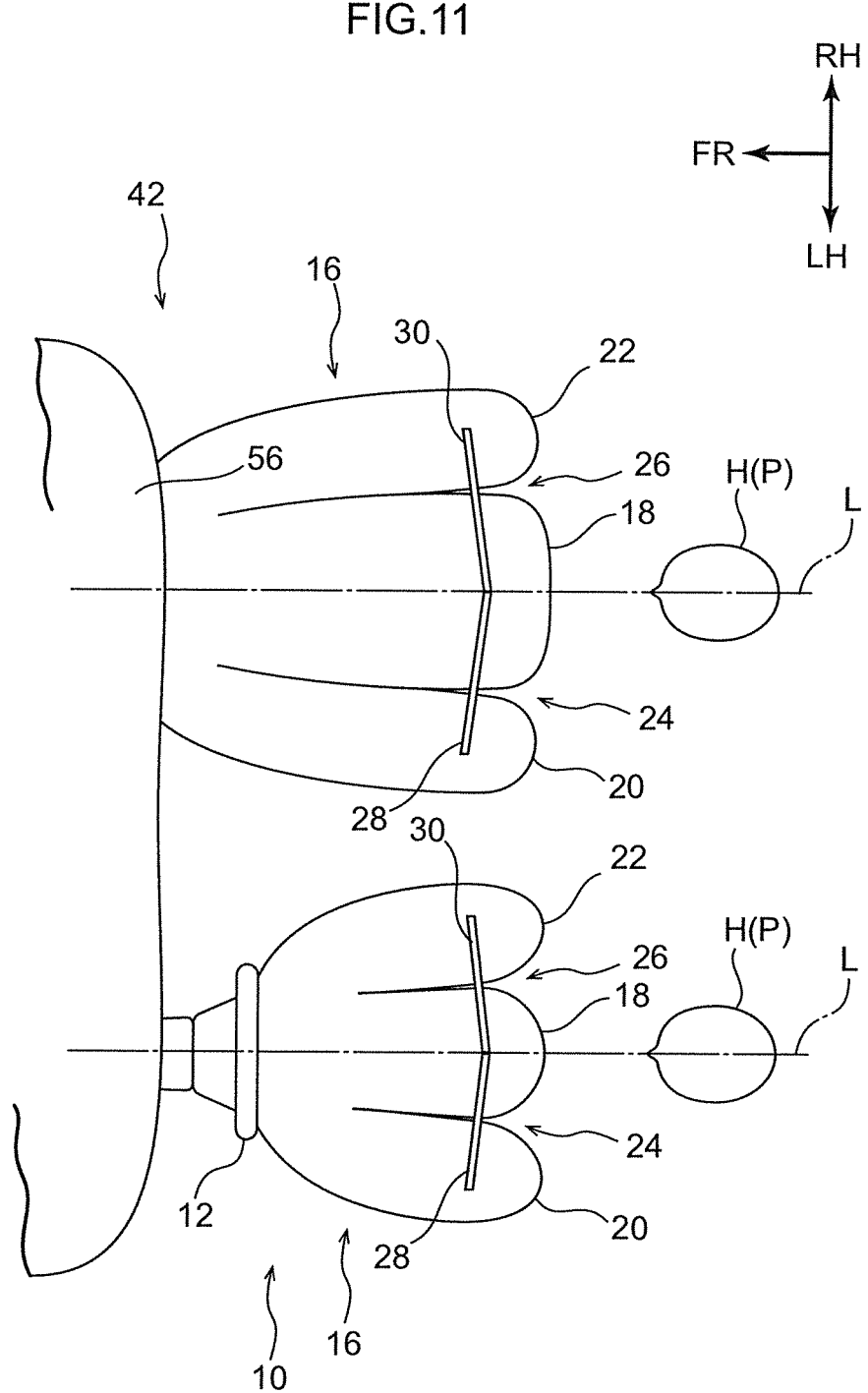
FIG. 11 is a plan view showing an airbag device in accordance with a third exemplary embodiment.

In the first exemplary embodiment and second exemplary embodiment described above, examples are described in which the present disclosure is applied to the airbag devices 10 and 32 that are disposed at the front side of a driver seat, but the present disclosure is not limited to the above exemplary embodiments. For example, as illustrated in FIG. 11, a structure similar to the airbag device 10 according to the first exemplary embodiment may be applied to an airbag device 42 according to a third exemplary embodiment, which is disposed at the front side of an assistant driver seat (a vehicle seat). The airbag device 42 for the assistant driver seat is provided inside an instrument panel 56. Members and portions of the airbag device 42 for the assistant driver seat that correspond with the airbag device 10 according to the first exemplary embodiment are assigned the same reference symbols as in the first exemplary embodiment.

Figure 12:
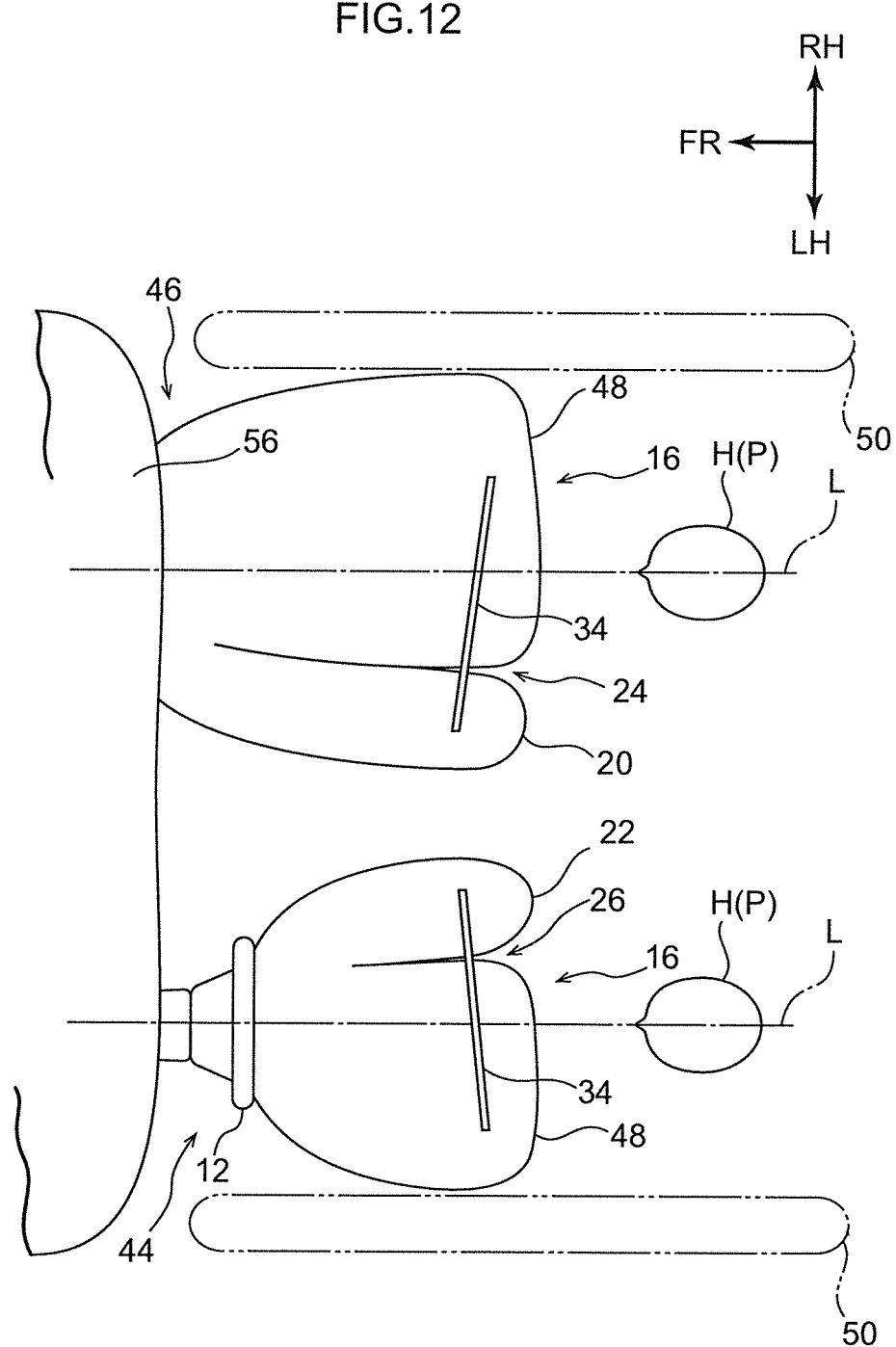
FIG. 12 is a plan view showing an airbag device in accordance with a fourth exemplary embodiment and an airbag device in accordance with a fifth exemplary embodiment.

In the first to third exemplary embodiments described above, examples are described in which the left side chamber portion 20 and the right side chamber portion 22 are provided at the left side and right side, respectively, of the center chamber portion 18 that is disposed to oppose the head H of a vehicle occupant P sitting on a vehicle seat in the front-and-rear direction (i.e., disposed on the seat center line L), but the present disclosure is not limited to the above exemplary embodiment. For example, as in airbag devices 44 and 46 relating to a fourth exemplary embodiment and a fifth exemplary embodiment, which are illustrated in FIG. 12, the airbag 16 may be structured to include a main chamber portion 48 corresponding to the center chamber portion 18 (see FIG. 11 and so forth), which serves as the first chamber portion, and the one of the right side chamber portion 22 and the left side chamber portion 20 that is disposed at the vehicle width direction inner side relative to the main chamber portion 48. In this structure, the head H of a vehicle occupant P may be restrained by the head H of the vehicle occupant P moving into the right side slit 26 or left side slit 24 of the airbag 16. In a case in which a curtain airbag 50 is provided that expands into a curtain shape, toward the vehicle lower side from a vehicle width direction outer side end portion of a roof headlining, the curtain airbag 50 is expanded at the vehicle width direction outer side of the main chamber portion 48. Therefore, the head H of the vehicle occupant P may be restrained by the head H of the vehicle occupant P moving to between the main chamber portion 48 and the side curtain airbag 50.

Figure 13:
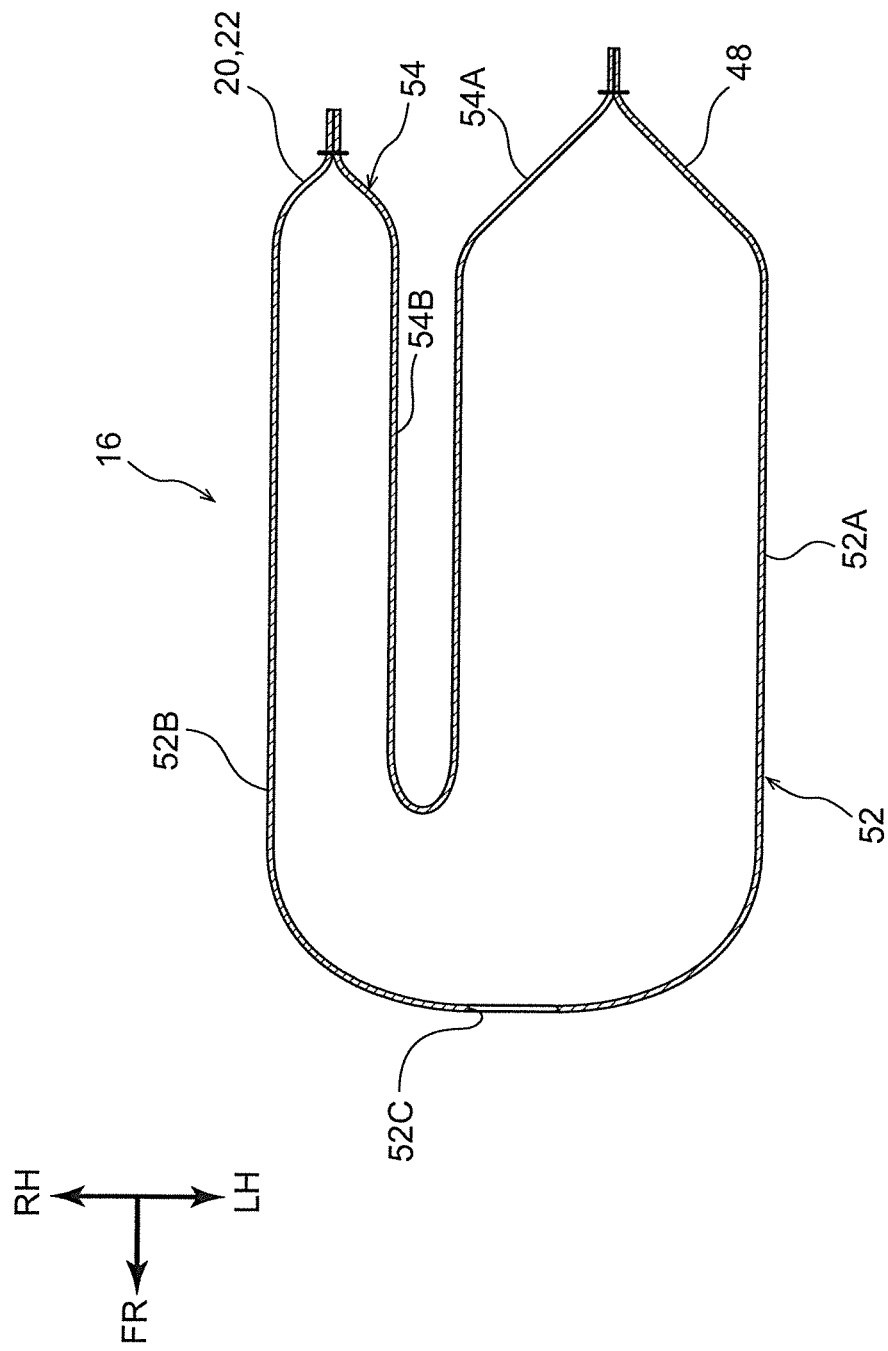
FIG. 13 is a sectional diagram for describing joining states of a first sheet member and second sheet member that structure portions of an airbag shown in FIG. 12.

As illustrated in FIG. 13, the airbag 16 that structures a portion of the airbag device 44 for a driver seat or the airbag device 46 for an assistant driver seat is fabricated employing a first sheet member 52 and a second sheet member 54 that are sheet-shaped and are formed in predetermined shapes. The first sheet member 52 is provided with a front side first extension portion 52A and a front side second extension portion 52B, which are to structure a region over the vehicle width direction outer side from the vehicle front side of the airbag 16 in the completed expansion state and a region over the vehicle width direction inner side from the vehicle front side, respectively. A gas generation device insertion hole 52C is formed at a boundary between the front side first extension portion 52A and the front side second extension portion 52B. The gas jetting-out portion of the gas generation device 14 (see FIG. 1), which is the portion at which the gas is jetted out, is to be inserted into the gas generation device insertion hole 52C. The second sheet member 54 is provided with a rear side first extension portion 54A and a rear side second extension portion 54B, which are to structure a region at the vehicle width direction outer side and a region at the vehicle width direction inner side of a region at the vehicle rear side of the airbag 16 in the completed expansion state. First, the main chamber portion 48 is formed by an outer periphery portion of the front side first extension portion 52A of the first sheet member 52 being joined to an outer periphery portion of the rear side first extension portion 54A of the second sheet member 54 (a first step). Then, the left side chamber portion 20 or right side chamber portion 22 is formed by an outer periphery portion of the front side second extension portion 52B of the first sheet member 52 being joined to an outer periphery portion of the rear side second extension portion 54B of the second sheet member 54 (a second step). Then, an end portion at one side of the tether 34 (see FIG. 12) and an end portion at another side of the tether 34 are joined to, respectively, an upper end portion of the main chamber portion 48 and an upper end portion of the left side chamber portion 20 or right side chamber portion 22 (a third step). Thus, the airbag 16 that structures a portion of the airbag device 44 or 46 is fabricated. The order of the first to third steps described above may be modified.

Hereabove, exemplary embodiments of the present disclosure have been described. The present disclosure is not limited by these descriptions, and it will be clear that numerous modifications outside of these descriptions may be embodied within a technical scope not departing from the spirit of the disclosure.

What is claimed is:
1. An airbag device, comprising:
a gas generation device that is operable to generate gas; and
an airbag that includes:
  a first chamber portion that is disposed at a vehicle front side of a vehicle seat on which a vehicle occupant sits, the first chamber portion being inflated due to gas generated by the gas generation device being supplied into the first chamber portion,
  a second chamber portion that is inflated due to gas generated by the gas generation device being supplied into the second chamber portion and that is disposed adjacent to the first chamber portion in a vehicle width direction, a boundary between the inflated first chamber portion and the second chamber portion being disposed so as to be offset in the vehicle width direction relative to a halfway line that divides the vehicle seat into equal halves in the vehicle width direction in plan view, and
  a connection portion that links regions at a vehicle upper side of a plurality of the inflated chamber portions together in the vehicle width direction,
  wherein in an inflated state of the airbag, the entire connection portion is configured to be set above a head top portion of a vehicle occupant sitting on the vehicle seat, the vehicle occupant has a same shape as an AM50 dummy.
2. The airbag device according to claim 1, wherein:
the airbag includes a pair of the second chamber portions, the pair of the second chamber portions respectively being disposed at one side and another side of the first chamber portion in the vehicle width direction; and
the connection portion links together the first chamber portion and the pair of the second chamber portions or links together one of the pair of the second chamber portions and the other of the pair of the second chamber portions.
3. The airbag device according to claim 2, wherein in a completed expansion state of the airbag, a dimension in an up-and-down direction of a rear end portion of the first chamber portion is set to be smaller than a dimension in the up-and-down direction of a rear end portion of the pair of the second chamber portions.
4. The airbag device according to claim 3, wherein, in an inflated state of the airbag, an end portion at a vehicle rear side of the first chamber portion is disposed at a vehicle front side relative to an end portion at a vehicle rear side of the second chamber portion.
5. The airbag device according to claim 1, wherein, in an inflated state of the airbag, an end portion at a vehicle rear side of the first chamber portion is disposed at a vehicle front side relative to an end portion at a vehicle rear side of the second chamber portion.
6. The airbag device according to claim 1, wherein a slit that opens to a vehicle rear side is formed at a boundary between the first chamber portion and the second chamber portion,
  wherein a length of the connection portion is set such that the head portion of the vehicle occupant who has the same shape as the AM50 dummy can be moved inside the slit,
  wherein in the inflated state of the airbag, a dimension from an apex at the vehicle rear side of the second chamber portion to a terminal end at a vehicle front side of the slit is set to a dimension larger than a distance from a front face of the head portion of the vehicle occupant to a center of gravity of the head portion.
7. The airbag device according to claim 1, wherein the airbag device is provided inside a center pad of a central portion of a steering wheel that is disposed at the front side of the vehicle seat, wherein the center pad is not rotationally displaced when the steering wheel is operated.
8. The airbag device according to claim 7, wherein:
the airbag includes a pair of the second chamber portions, the pair of the second chamber portions respectively being disposed at one side and another side of the first chamber portion in the vehicle width direction; and
the connection portion links together the first chamber portion and the pair of the second chamber portions or links together one of the pair of the second chamber portions and the other of the pair of the second chamber portions.
9. The airbag device according to claim 7, wherein, in an inflated state of the airbag, an end portion at a vehicle rear side of the first chamber portion is disposed at a vehicle front side relative to an end portion at a vehicle rear side of the second chamber portion.

10. An airbag fabrication method to fabricate an airbag of an airbag device that includes:
    a gas generation device that is operable to generate gas; and
    the airbag that includes:
        a first chamber portion that is disposed at a vehicle front side of a vehicle seat on which a vehicle occupant sits, the first chamber portion being inflated due to gas generated by the gas generation device being supplied into the first chamber portion,
        a second chamber portion that is inflated due to gas generated by the gas generation device being supplied into the second chamber portion and that is disposed adjacent to the first chamber portion in a vehicle width direction, a boundary between the inflated first chamber portion and the second chamber portion being disposed so as to be offset in the vehicle width direction relative to a halfway line that divides the vehicle seat into equal halves in the vehicle width direction in plan view, and
        a connection portion that links regions at a vehicle upper side of a plurality of the inflated chamber portions together in the vehicle width direction,
    the method employing a first sheet member and a second sheet member,
    wherein the first sheet member is formed in a sheet shape and includes a front side first extension portion and a front side second extension portion that structure regions at one side and another side in the vehicle width direction of a region at a vehicle front side of the inflated airbag, a gas generation device insertion hole at which a portion of the gas generation device is inserted being formed at a boundary between the front side first extension portion and the front side second extension portion, and
    wherein the second sheet member is formed in a sheet shape and includes a rear side first extension portion and a rear side second extension portion that structure regions at one side and another side in the vehicle width direction of a region at a vehicle rear side of the inflated airbag, the method comprising:
    forming the first chamber portion by joining an outer periphery portion of the front side first extension portion to an outer periphery portion of the rear side first extension portion;
    forming the second chamber portion by joining an outer periphery portion of the front side second extension portion to an outer periphery portion of the rear side second extension portion; and
    joining one or more of the connection portion to a plurality of the chamber portions.

11. An airbag fabrication method to fabricate an airbag of an airbag device that includes:
    a gas generation device that is operable to generate gas; and
    the airbag that includes:
        a first chamber portion that is disposed at a vehicle front side of a vehicle seat on which a vehicle occupant sits, the first chamber portion being inflated due to gas generated by the gas generation device being supplied into the first chamber portion,
        a pair of second chamber portions that are inflated due to gas generated by the gas generation device being supplied into the pair of second chamber portions and that the pair of the second chamber portions respectively being disposed at one side and another side of the first chamber portion in a vehicle width direction, a boundary between the inflated first chamber portion and the pair of second chamber portions being disposed so as to be offset in the vehicle width direction relative to a halfway line that divides the vehicle seat into equal halves in the vehicle width direction in plan view, and
        a connection portion that links regions at a vehicle upper side of a plurality of the inflated chamber portions together in the vehicle width direction, the connection portion links together the first chamber portion and the pair of the second chamber portions or links together one of the pair of the second chamber portions and the other of the pair of the second chamber portions,
    the method employing a first sheet member, a second sheet member and a third sheet member,
    wherein the first sheet member is formed in a sheet shape and includes a front side first extension portion and a front side second extension portion that structure regions at one side and another side in the vehicle width direction of a region at a vehicle front side of the inflated airbag, a gas generation device insertion hole at which a portion of the gas generation device is inserted being formed at a boundary between the front side first extension portion and the front side second extension portion,
    wherein the second sheet member is formed in a sheet shape and includes a rear-left side first extension portion and a rear-left side second extension portion that structure a region at a vehicle rear side, and at one side in the vehicle width direction, of the inflated airbag, and
    wherein the third sheet member is formed in a sheet shape and includes a rear-right side first extension portion and a rear-right side second extension portion that structure a region at a vehicle rear side, and at another side in the vehicle width direction, of the inflated airbag, the method comprising:
    forming the second chamber portion at the one side of the first chamber portion by joining an outer periphery portion of the front side first extension portion to an outer periphery portion of the rear-left side first extension portion;
    forming the second chamber portion at the another side of the first chamber portion by joining an outer periphery portion of the front side second extension portion to an outer periphery portion of the rear-right side first extension portion;
    forming the first chamber portion by joining an outer periphery portion of the rear-left side second extension portion to an outer periphery portion of the rear-right side second extension portion; and
    joining one or more of the connection portions to a plurality of the chamber portions.

* * * * *